United States Patent
Yoon et al.

(10) Patent No.: US 10,108,159 B2
(45) Date of Patent: Oct. 23, 2018

(54) AIR CONDITIONER AND METHOD OF CONTROLLING THE SAME

(71) Applicant: LG ELECTRONICS INC., Seoul (KR)

(72) Inventors: Pilhyun Yoon, Seoul (KR); Jaewon Lee, Seoul (KR); Yongcheol Sa, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 430 days.

(21) Appl. No.: 14/851,333

(22) Filed: Sep. 11, 2015

(65) Prior Publication Data

US 2016/0131384 A1 May 12, 2016

(30) Foreign Application Priority Data

Nov. 12, 2014 (KR) .................. 10-2014-0156819

(51) Int. Cl.
*G05B 21/00* (2006.01)
*G01M 1/38* (2006.01)
(Continued)

(52) U.S. Cl.
CPC .............. *G05B 15/02* (2013.01); *F24F 11/30* (2018.01); *F24F 11/62* (2018.01); *F24F 11/70* (2018.01);
(Continued)

(58) Field of Classification Search
CPC .. F24F 11/006; F24F 11/0076; F24F 11/0012; F24F 11/0015; F24F 11/30;
(Continued)

(56) References Cited

U.S. PATENT DOCUMENTS 5,355,323 A * 10/1994 Bae .................. F24F 3/1405
236/44 C
6,244,057 B1 * 6/2001 Yoshida .............. F25B 13/00
62/151
(Continued)

FOREIGN PATENT DOCUMENTS

DE 112012005143 T5 10/2014
EP 2873929 A1 5/2015
(Continued)

*Primary Examiner* — Thomas C Lee
*Assistant Examiner* — Zhipeng Wang
(74) *Attorney, Agent, or Firm* — Dentons US LLP (57) ABSTRACT

An air conditioner having an outdoor unit provided with a compressor, an outdoor temperature sensor, an outdoor humidity recognition part, and a control part, wherein the outdoor temperature sensor is installed on the outdoor unit to sense outdoor temperature, wherein the outdoor humidity recognition part is installed on the outdoor unit to recognize outdoor humidity information, and wherein the control part controls an operation of the compressor based information sensed from the outdoor temperature sensor and the outdoor humidity recognition part, whereby when the outdoor temperature has a preset value, the control part determines target evaporation temperature such that the target evaporation temperature is decreased as outdoor humidity increases, and the control part drives the compressor at an operation frequency corresponding to the determined target evaporation temperature.

12 Claims, 9 Drawing Sheets

(51) Int. Cl.
*G05B 13/00* (2006.01)
*G05B 15/00* (2006.01)
*G05D 23/00* (2006.01)
*G05B 15/02* (2006.01)
*F25B 49/02* (2006.01)
*F24F 11/30* (2018.01)
*F24F 11/62* (2018.01)
*F24F 11/70* (2018.01)
*F24F 110/10* (2018.01)
*F24F 110/12* (2018.01)
*F24F 110/20* (2018.01)
*F24F 110/22* (2018.01)
*F24F 11/64* (2018.01)

(52) U.S. Cl.
CPC ............ F25B 49/02 (2013.01); F25B 49/022 (2013.01); F25B 49/025 (2013.01); *F24F 11/64* (2018.01); *F24F 2110/10* (2018.01); *F24F 2110/12* (2018.01); *F24F 2110/20* (2018.01); *F24F 2110/22* (2018.01); *F25B 2313/0294* (2013.01); *F25B 2600/11* (2013.01); *F25B 2600/2513* (2013.01); *F25B 2700/02* (2013.01); *F25B 2700/2106* (2013.01)

(58) Field of Classification Search
CPC .. F24F 11/62; F24F 11/64; F24F 11/70; F24F 2011/0013; F24F 2011/0016; F24F 2011/0063; F24F 2110/10; F24F 2110/12; F24F 2110/20; F24F 2110/22; F25B 49/025; F25B 49/02; F25B 49/022; F25B 2313/0294; F25B 2600/11; F25B 2600/2513; F25B 2700/02; F25B 2700/2106; G05B 15/02
USPC ........................................................ 700/278
See application file for complete search history.

(56) References Cited

U.S. PATENT DOCUMENTS

| | | | | |
|---|---|---|---|---|
| 7,239,991 | B2* | 7/2007 | Tuszynski | G05B 17/02 700/13 |
| 2001/0001927 | A1* | 5/2001 | Jackson, Jr. | G01W 1/17 73/335.02 |
| 2009/0230202 | A1* | 9/2009 | Matsui | F24F 3/1411 236/44 A |
| 2010/0114550 | A1* | 5/2010 | Fujihara | F24F 11/0009 703/13 |
| 2012/0266621 | A1* | 10/2012 | Yokohara | F25B 47/022 62/155 |
| 2014/0360215 | A1 | 12/2014 | Inaba | |
| 2017/0038087 | A1* | 2/2017 | Nabeshima | F24F 11/0012 |

FOREIGN PATENT DOCUMENTS

| | | |
|---|---|---|
| JP | 2002-286327 A | 10/2002 |
| JP | 2006-329579 A | 12/2006 |
| KR | 10-1993-0018234 A | 9/1993 |
| KR | 10-2014-0090323 A | 7/2014 |

\* cited by examiner

Fig. 9

AIR CONDITIONER AND METHOD OF CONTROLLING THE SAME

CROSS-REFERENCE TO RELATED APPLICATIONS

The present application claims priority under 35 U.S.C. 119 and 35 U.S.C. 365 to Korean Patent Application No. 10-2014-0156819 (filed on Nov. 12, 2014), which is hereby incorporated by reference in its entirety.

BACKGROUND

The present disclosure relates to an air conditioner and a method of controlling the air conditioner.

Air conditioners optimally condition air in a predetermined space according to the uses and purposes thereof. Such an air conditioner includes a compressor, a condenser, an expansion device, and an evaporator, and performs a refrigerating cycle for compressing, condensing, expanding, and evaporating refrigerant, to thereby cool or heat the predetermined space.

The predetermined space may be variously changed according to areas where the air conditioner is used. For example, when the air conditioner is installed in a home or an office, the predetermined space may be an indoor space of a house or a building. When the air conditioner is installed in a vehicle, the predetermined space may be a passenger space.

When an air conditioner performs a cooling operation, an outdoor heat exchanger installed in an outdoor unit functions as a condenser, and an indoor heat exchanger installed in an indoor unit functions as an evaporator. On the contrary, when the air conditioner performs a heating operation, the indoor heat exchanger functions as a condenser, and the outdoor heat exchanger functions as an evaporator.

Figure 1:
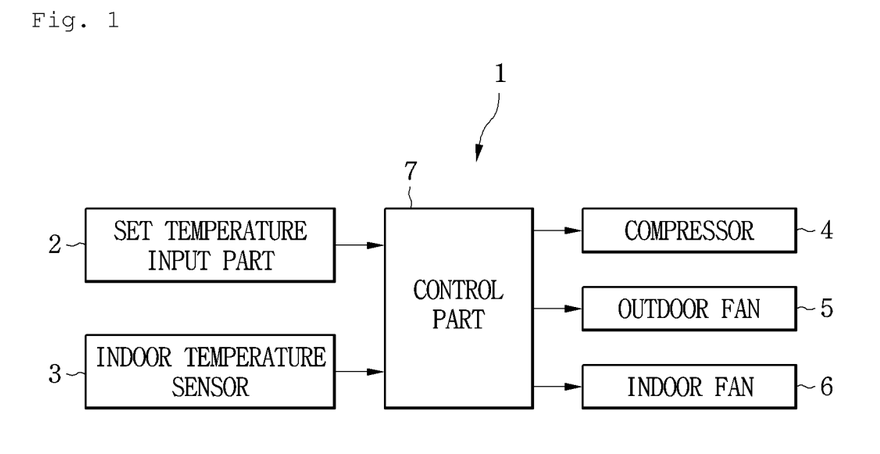
FIG. 1 is a block diagram illustrating a configuration of an air conditioner in the related art.

FIG. 1 is a block diagram illustrating a configuration of an air conditioner in the related art.

Referring to FIG. 1, an air conditioner 1 includes a set temperature input part 2 for inputting a set temperature of an indoor space, an indoor temperature sensor 3 that senses temperature of the indoor space, and a control part 7 that controls operations of a compressor 4, an outdoor fan 5, and an indoor fan 6, based on temperature information sensed by the set temperature input part 2 and the indoor temperature sensor 3.

The set temperature input part 2, the indoor temperature sensor 3, and the indoor fan 6 may be included in an indoor unit, and the compressor 4 and the outdoor fan 5 may be included in an outdoor unit.

For example, when a temperature value sensed at the indoor temperature sensor 3 is higher than a set temperature value input through the set temperature input part 2 during a cooling operation of the air conditioner 1, the control part 7 may operate the compressor 4, the outdoor fan 5, and the indoor fan 6. The operation of the control part 7 may be performed until the temperature of the indoor space reaches the set temperature value.

As such, air conditioners in the related art control operations of a compressor and a blowing fan, based on a temperature value of an indoor space, and a humidity value is not considered in operating the air conditioners. When humidity is relatively high, a person may feel uncomfortable in the indoor space.

A capacity of air conditioners includes a sensitive heat load for decreasing indoor temperature, and a latent heat load for decreasing humidity of an indoor space. When the indoor temperature or the humidity is high, it is needed for the air conditioners to decrease evaporation temperature, thereby increasing a cooling capacity.

However, since air conditioners in the related art do not consider a humidity value, as described above, the air conditioners are designed such that evaporation temperature is equal to or lower than a set temperature in a refrigerating cycle, thereby having a sufficient capacity even in an environment such as summer where relative humidity is high.

When an air conditioner designed as described above is operated in an environment having low humidity, an excessive operation of a compressor may decrease operation efficiency, and excessively low discharge temperature may make a user uncomfortable.

To address these issues, a humidity sensor may be provided to an indoor unit to use a humidity value when an air conditioner is operated. However, when an air conditioner such as a system air conditioner has a plurality of indoor units, humidity sensors may be installed on the indoor units, respectively, which excessively increases costs.

SUMMARY

Embodiments provide an air conditioner adapted for improving cooling efficiency, and a method of controlling the air conditioner.

In one embodiment, an air conditioner includes: an outdoor unit provided with a compressor; an outdoor temperature sensor installed on the outdoor unit to sense outdoor temperature; an outdoor humidity recognition part installed on the outdoor unit to recognize outdoor humidity information; and a control part that controls an operation of the compressor, based information sensed from the outdoor temperature sensor and the outdoor humidity recognition part, wherein when the outdoor temperature has a preset value, the control part determines target evaporation temperature such that the target evaporation temperature is decreased as outdoor humidity increases, and the control part drives the compressor at an operation frequency corresponding to the determined target evaporation temperature.

The outdoor humidity recognition part may include an outdoor humidity sensor.

The air conditioner may further include a memory part in which information about the target evaporation temperature is mapped according to a value of the outdoor temperature and a value of the outdoor humidity.

When the outdoor temperature is between a first set temperature (T1) and a second set temperature (T2) higher than the first set temperature (T1), the control part may control the compressor based on information mapped such that the target evaporation temperature is linearly decreased as the outdoor temperature increases.

The mapped information may include information determined such that as the outdoor humidity increases, a slope corresponding to a ratio of a decrease value of the target evaporation temperature to an increase value of the outdoor temperature is decreased as the outdoor humidity increases.

When the outdoor temperature is lower than the first set temperature (T1), the control part may control the compressor based on information mapped such that the target evaporation temperature is maintained at a preset target evaporation temperature according to the outdoor humidity, regardless of a change of the outdoor temperature.

A preset target evaporation temperature (Tg5) mapped at a first outdoor humidity (RHA1) may be higher than a preset target evaporation temperature (Tg4) mapped at a second outdoor humidity (RHA2) higher than the first outdoor humidity (RHA1).

When the outdoor temperature is higher than the second set temperature (T2), the control part may control the compressor based on information mapped such that the target evaporation temperature is maintained at a first reference evaporation temperature (Tg1), regardless of changes of the outdoor temperature and the outdoor humidity.

When the outdoor humidity is equal to or greater than a preset humidity (RHA5), the control part may control the compressor based on information mapped such that the target evaporation temperature is maintained at the first reference evaporation temperature.

The air conditioner may further include a control set part adapted to select through an on/off operation whether to control the compressor using the outdoor temperature and the outdoor humidity, wherein the control set part is provided with an input part adapted to manually input a humidity value.

The outdoor humidity recognition part may include a communication part that receives the outdoor humidity information from a server.

The outdoor unit may include an outdoor fan and a main expansion valve, and the number of rotations of the outdoor fan and a degree of opening of the main expansion valve may be determined corresponding to the determined target evaporation temperature.

In another embodiment, a method of controlling an air conditioner includes: inputting an operation command for the air conditioner; recognizing information about outdoor temperature and outdoor humidity of an outdoor space; and controlling an operation of the air conditioner, based on information mapped such that target evaporation temperature is linearly decreased as the outdoor temperature increases when the outdoor temperature is between a first set temperature (T1) and a second set temperature (T2).

When the outdoor temperature is lower than the first set temperature (T1), a predetermined target evaporation temperature may be maintained according to the outdoor humidity, regardless of a change of the outdoor temperature.

When the outdoor temperature is higher than the second set temperature (T2), a predetermined target evaporation temperature may be maintained regardless of changes of the outdoor temperature and the outdoor humidity.

In further another embodiment, an air conditioner includes: an outdoor unit provided with a compressor; an outdoor temperature sensor installed on the outdoor unit to sense outdoor temperature; an outdoor humidity recognition part installed on the outdoor unit to recognize outdoor humidity information; and a control part that controls an operation of the compressor, based information sensed from the outdoor temperature sensor and the outdoor humidity recognition part, wherein when it is recognized that the outdoor temperature is in a preset range (T1 to T2), the control part determines target evaporation temperature based on information mapped such that the target evaporation temperature is maintained or decreased as the outdoor temperature increases, and the control part drives the compressor at an operation frequency corresponding to the determined target evaporation temperature.

When it is recognized that the outdoor temperature is in the preset range (T1 to T2), and outdoor humidity is equal to or greater than a preset fifth outdoor humidity, the control part may determine the target evaporation temperature as a first reference evaporation temperature (Tg1).

When it is recognized that the outdoor temperature is in the preset range (T1 to T2), and the outdoor humidity is lower than the preset fifth outdoor humidity, the control part may determine the target evaporation temperature based on information mapped such that the target evaporation temperature is decreased as the outdoor temperature increases.

The information mapped such that the target evaporation temperature is decreased may include information mapped such that the target evaporation temperature is linearly decreased.

When it is recognized that the outdoor temperature is higher than the preset range (T1 to T2), the control part may determine the target evaporation temperature as the first reference evaporation temperature (Tg1).

When it is recognized that the outdoor temperature is lower than the preset range (T1 to T2), the control part may determine that the target evaporation temperature is maintained at specific evaporation temperatures, which are mapped according to values of the outdoor humidity, respectively.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to embodiments of the present disclosure, examples of which are illustrated in the accompanying drawings.

Figure 2:
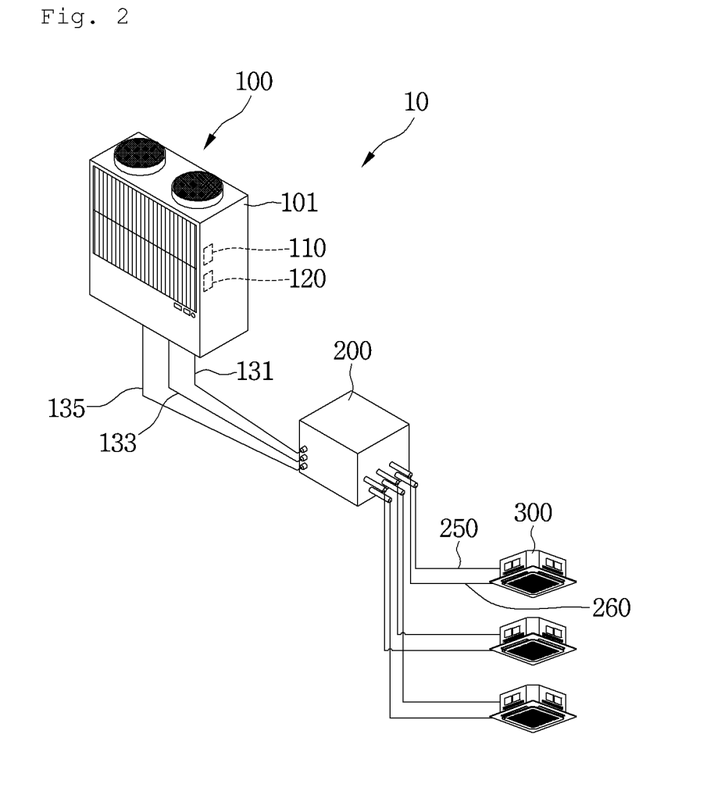
FIG. 2 is a view illustrating a configuration of an air conditioner according to an embodiment.
Figure 3:
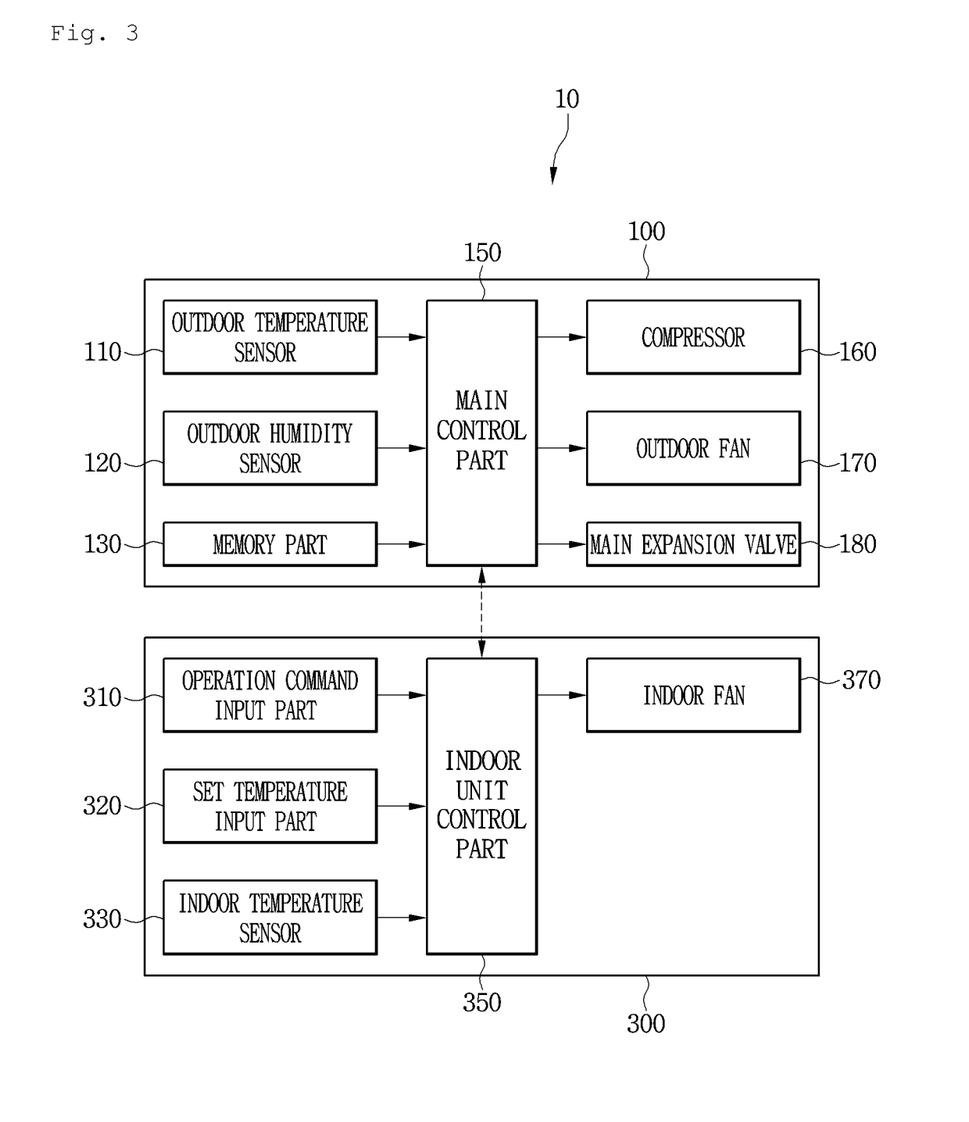
FIG. 3 is a block diagram illustrating the configuration of the air conditioner according to the embodiment of FIG. 2.

FIG. 2 is a view illustrating a configuration of an air conditioner according to an embodiment. FIG. 3 is a block diagram illustrating the configuration of the air conditioner according to the embodiment of FIG. 2.

Referring to FIG. 2, an air conditioner 10 according to the current embodiment includes an outdoor unit 100, a distributing unit 200, and a plurality of indoor units 300.

In detail, the air conditioner 10 includes three pipe arrangements 131, 133, and 135 which connect the outdoor unit 100 to the distributing unit 200. The pipe arrangements 131, 133, and 135 include a first connecting pipe arrangement 131, a second connecting pipe arrangement 133, and a third connecting pipe arrangement 135.

The air conditioner 10 includes a plurality of distributing pipe arrangements 250 and 260 which connect the distributing unit 200 to the indoor units 300. The distributing pipe arrangements 250 and 260 may include an inflow pipe arrangement 250 that guides an inflow of refrigerant to one of the indoor units 300, and an outflow pipe arrangement 260 that guides an outflow of the refrigerant from the indoor unit 300. The inflow pipe arrangement 250 and the outflow pipe arrangement 260 may be provided to correspond to each of the indoor units 300.

The outdoor unit 100 includes a case 101 forming an appearance thereof and equipped with a plurality of elements, and an outdoor temperature sensor 110 and an outdoor humidity sensor 120, which are installed at a side of the case 101.

The elements includes a compressor 160 that compresses the refrigerant, an outdoor fan 170 that moves outdoor air to an outdoor heat exchanger (not shown), and a main expansion valve 180 for depressurizing the refrigerant. The outdoor temperature sensor 110 is installed in the case 101 to sense outdoor temperature, and the outdoor humidity sensor 120 is installed in the case 101 to sense outdoor humidity.

The outdoor unit 100 includes a memory part 130 that map values sensed, respectively, by the outdoor temperature sensor 110 and the outdoor humidity sensor 120 onto values of target evaporation temperature of a refrigerating cycle to store the sensed values and the values of the target evaporation temperature.

The values of the target evaporation temperature are temperature values corresponding to a low pressure of the refrigerating cycle and may be controlled by adjusting an operation frequency of the compressor 160. For example, when the operation frequency of the compressor 160 increases, the target evaporation temperature may decrease, and a cooling capacity of the air conditioner 10 may be improved. On the contrary, when the operation frequency of the compressor 160 decreases, the target evaporation temperature may increase.

Thus, the memory part 130 may store mapping information, which relates to the values sensed, respectively, by the outdoor temperature sensor 110 and the outdoor humidity sensor 120, and the operation frequency of the compressor 160.

When the operation frequency of the compressor 160 is increased to increase the cooling capacity of the air conditioner 10, the number of rotations of the outdoor fan 170 and a degree of opening of the main expansion valve 180 may be increased. On the contrary, when the operation frequency of the compressor 160 is decreased to decrease the cooling capacity of the air conditioner 10, the number of the rotations of the outdoor fan 170 and the degree of opening of the main expansion valve 180 may be decreased.

To this end, the memory part 130 may store mapping information, which relates to the values sensed, respectively, by the outdoor temperature sensor 110 and the outdoor humidity sensor 120, the number of the rotations of the outdoor fan 170, and the degree of opening of the main expansion valve 180.

The outdoor unit 100 further includes a main control part 150, which uses information stored in the memory part 130 and the values sensed, respectively, by the outdoor temperature sensor 110 and the outdoor humidity sensor 120, to control operations of the compressor 160, the outdoor fan 170, and the main expansion valve 180.

The indoor units 300 include an operation command input part 310 on which an input operation can be performed to start operations of the indoor units 300, a set temperature input part 320 for inputting a desired temperature for an indoor space, and an indoor temperature sensor 330 for sensing a temperature of the indoor space.

The indoor units 300 further include an indoor unit control part 350, which controls an operation of an indoor fan 370, based on information input or recognized from the operation command input part 310, the set temperature input part 320, and the indoor temperature sensor 330.

The main control part 150 may be connected to the indoor unit control part 350 such that the main control part 150 can communicate with the indoor unit control part 350. A combination of the main control part 150 and the indoor unit control part 350 may be referred to as "a control part".

Figure 4:
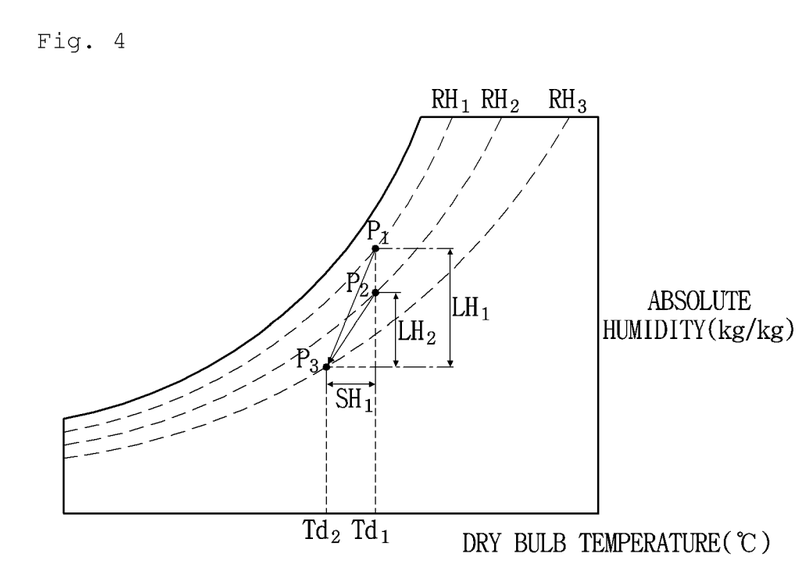
FIG. 4 is a psychrometric chart illustrating a cooling capacity of the air conditioner according to the embodiment of FIG. 2, which includes a sensible heat load and a latent heat load.
Figure 5:
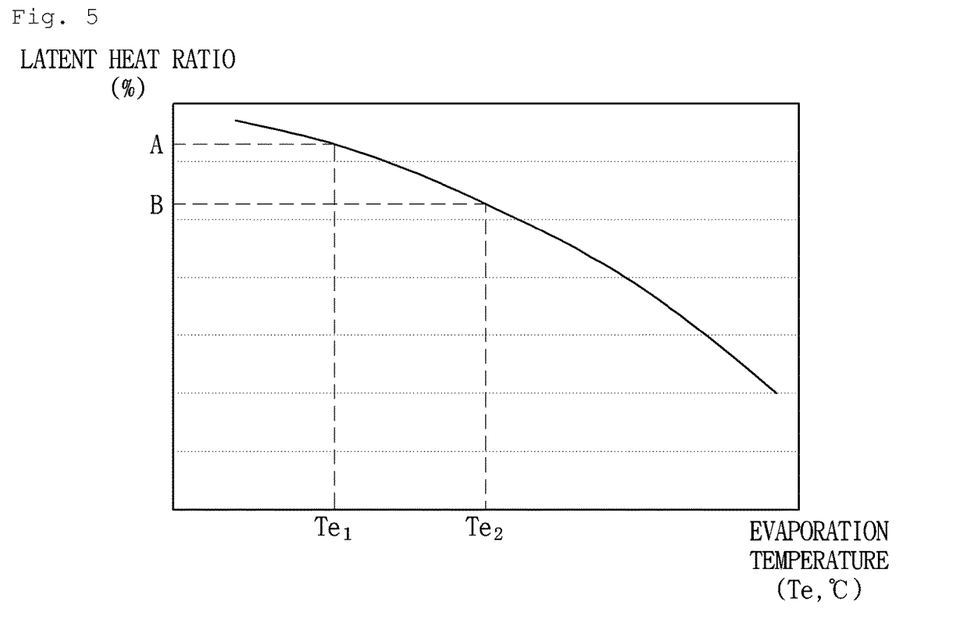
FIG. 5 is a graph showing evaporation temperature varying according to latent heat ratios of the cooling capacity of the air conditioner according to the embodiment of FIG. 2.

FIG. 4 is a psychrometric chart showing a cooling capacity of the air conditioner according to the current embodiment, which includes a sensible heat load and a latent heat load. FIG. 5 is a graph showing evaporation temperature varying according to latent heat ratios of the cooling capacity of the air conditioner according to the current embodiment.

Referring to FIG. 4, the air conditioner 10 may obtain a predetermined cooling capacity through a cooling operation, and the predetermined cooling capacity may include a sensible heat capacity (load) for decreasing indoor temperature, and a latent heat capacity (load) for decreasing indoor humidity.

A horizontal axis and a vertical axis of the psychrometric chart illustrated in FIG. 4 denote dry bulb temperature (° C.) and absolute humidity (kg/kg) of an indoor space, respectively, and dotted lines of the psychrometric chart denote relative humidities RH1, RH2, and RH3, respectively. For example, the relative humidities RH1, RH2, and RH3 may be 80%, 50%, and 30%, respectively.

Humid air defined at a point P1 has a dry bulb temperature Td1 and the relative humidity RH1. Humid air defined at a point P2 has the dry bulb temperature Td1 and the relative humidity RH2. That is, the humid air defined at the point P1 is the same as the humid air defined at the point P2, in terms of dry bulb temperature, but is higher than the humid air defined by the point P2, in terms of relative humidity.

When cooling operations are performed on an indoor space having the humid air defined at the point P1, and an indoor space having the humid air defined at the point P2, respectively, such that the indoor spaces have humid air defined at a point P3, a cooling capacity required for cooling the indoor space having the humid air defined at the point P1 is greater than a cooling capacity required for cooling the indoor space having the humid air defined at the point P2. The humid air defined at the point P3 has a dry bulb temperature Td2 and the relative humidity RH3. The dry bulb temperature Td2 is lower than dry bulb temperature Td1, and the relative humidity RH3 is lower than the relative humidities RH1 and RH2.

In detail, when the air conditioner 10 cools the indoor space having the humid air at the point P1, the air conditioner 10 needs a latent heat load LH1 for removing humidity, and a sensible heat load SH1 for decreasing indoor temperature. That is, the air conditioner 10 has a cooling capacity formed by a first cooling capacity (LH1+SH1).

When the air conditioner 10 cools the indoor space having the humid air at the point P2, the air conditioner 10 needs a latent heat load LH2 for removing humidity, and the sensible heat load SH1 for decreasing indoor temperature. That is, the air conditioner 10 has a cooling capacity formed by a second cooling capacity (LH2+SH1).

Since the latent heat load LH1 is greater than latent heat load LH2, the first cooling capacity is greater than the second cooling capacity. In other words, the cooling capacity of the air conditioner 10 for cooling the indoor space having the humid air at the point P1 is greater than the cooling capacity of the air conditioner 10 for cooling the indoor space having the humid air at the point P2.

Since an indoor space is controlled during an operation of an air conditioner, it is needed to control indoor humidity. However, it is inefficient in terms of cost and reliability to sense and control humidify of an indoor space at all times, as described in the related art.

Relative humidity of an indoor space (hereinafter, which may be referred to as indoor humidity), and relative humidity of an outdoor space (hereinafter, which may be referred to as outdoor humidity) may be have predetermined patterns or tendencies. For example, when relative humidity of an outdoor space is high in hot and humid summer, relative humidity of an indoor space may also be high. In addition, when relative humidity of an outdoor space is low in cold and dry winter, relative humidity of an indoor space may also be low.

Based on such tendencies of outdoor humidity and indoor humidity, indoor humidity may be predicted from the outdoor humidity. Thus, a cooling control may be performed using the outdoor humidity, without directly sensing the indoor humidity.

Referring to FIG. 5, a control may be performed such that evaporation temperature (Te) of the air conditioner 10 varies according to rations of a latent heat load of the whole cooling capacity of the air conditioner 10. For example, when the latent heat load is relatively high, an amount of humidity to be removed is great, and thus, the operation frequency of the compressor 160 may be increased to decrease the evaporation temperature (Te). On the contrary, when the latent heat load is relatively low, the amount of humidity to be removed is small, and thus, the operation frequency of the compressor 160 may be decreased to increase the evaporation temperature (Te).

In detail, a latent heat ratio A on a vertical axis of FIG. 5 corresponds to the cooling operation from the point P1 to the point P3 of FIG. 4, and a latent heat ratio B on the vertical axis of FIG. 5 corresponds to the cooling operation from the point P2 to the point P3 of FIG. 4.

An evaporation temperature Te1 corresponding to the latent heat ratio A may be lower than an evaporation temperature Te2 corresponding to the latent heat ratio B. As a result, a comfortable operation in which the air conditioner 10 has a great cooling capacity to decrease the humidity may be performed at the latent heat ratio A, and a high efficiency operation in which the air conditioner 10 has a relatively small cooling capacity may be performed at the latent heat ratio B.

Figure 6:
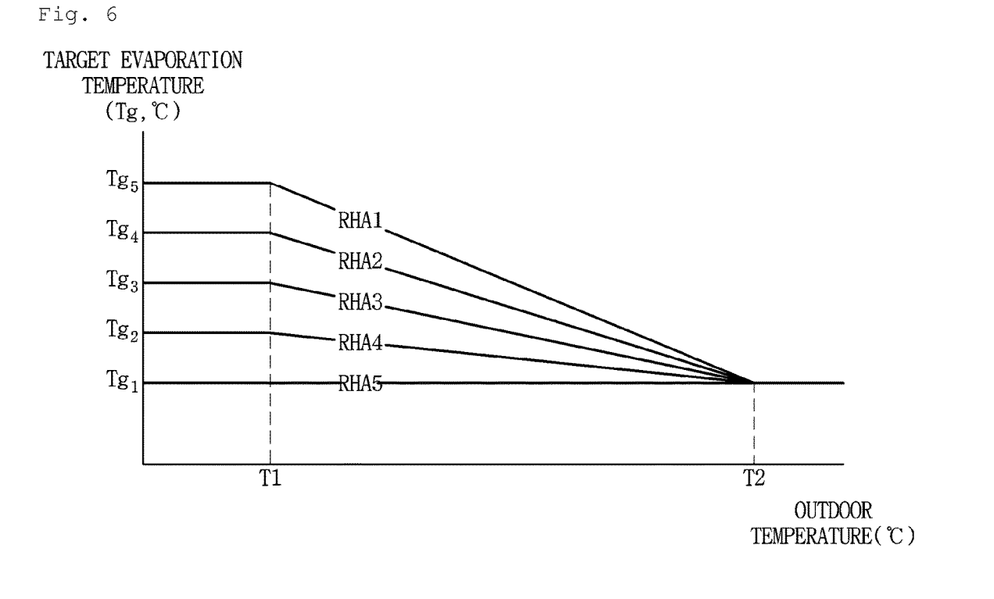
FIG. 6 is a graph showing variations in target evaporation temperature controlled according to relative humidity and outdoor temperature in an operation of the air conditioner according to the embodiment of FIG. 2.

FIG. 6 is a graph showing variations in target evaporation temperature controlled according to relative humidity and outdoor temperature in an operation of the air conditioner according to the current embodiment.

Referring to FIG. 6, the target evaporation temperature of the air conditioner 10 may vary based on both outdoor temperature sensed at the outdoor temperature sensor 110 and outdoor humidity sensed at the outdoor humidity sensor 120. The target evaporation temperature may be controlled by adjusting the operation frequency of the compressor 160, the number of the rotations of the outdoor fan 170, and the degree of opening of the main expansion valve 180.

The memory part 130 may store information obtained by mapping the outdoor temperature and the outdoor humidity onto the target evaporation temperature. Thus, when the outdoor temperature and the outdoor humidity are sensed, the target evaporation temperature may be determined.

Information related to an operation frequency of the compressor 160 to be operated, the number of rotations of the outdoor fan 170 to be operated, and a degree of opening of the main expansion valve 180 to be operated may be mapped corresponding to the determined target evaporation temperature and be stored in the memory part 130.

When the outdoor temperature is lower than a first set temperature T1, the air conditioner 10 may be operated and controlled according to the outdoor humidity and the determined target evaporation temperature, regardless of a change of the outdoor temperature. For example, the outdoor humidity is an outdoor humidity RHA1 (a first outdoor humidity), the determined target evaporation temperature is a target evaporation temperature Tg5. In addition, the outdoor humidity is an outdoor humidity RHA2 (a second outdoor humidity), the determined target evaporation temperature is a target evaporation temperature Tg4. When the outdoor humidity is an outdoor humidity RHA3, RH4, or RH5 (one of third to fifth outdoor humidities), the determined target evaporation temperature may be a target evaporation temperature Tg3, Tg2, or Tg1.

Although FIG. 6 illustrates an exemplified spirit in which target evaporation temperatures are determined according to five outdoor humidities, target evaporation temperatures determined according to a range of more outdoor humidity values or outdoor humidities may be stored in the memory part 130 in practice.

When the outdoor temperature is lower than the first set temperature T1 as described above, the need for a cooling capacity is substantially not great. Thus, even when the air conditioner 10 is operated, target evaporation temperatures may be controlled to remain steady according to outdoor humidities, thereby simplifying a control method.

When the outdoor temperature is equal to or higher than a second set temperature T2, the air conditioner 10 may be operated and controlled according to the target evaporation temperature Tg1, regardless of changes of the outdoor temperature and the outdoor humidity. The second set temperature T2 is set to be higher than the first set temperature T1. Since the case that the outdoor temperature is equal to or higher than the second set temperature T2 means relatively quite hot weather, the air conditioner 10 may be operated to have a sufficient cooling capacity.

Since the target evaporation temperature Tg1 corresponds to the sufficient cooling capacity, the target evaporation temperature Tg1 may be called "a first reference evaporation temperature". For example, the sufficient cooling capacity may be in a range of 90% to 100% of the maximum capacity of the air conditioner 10.

The outdoor humidities RHA1 to RHA5 shown in the graph of FIG. 6 satisfy a relationship of RHA1<RHA2<RHA3<RHA4<RHA5.

When the outdoor temperature is in a range from the first set temperature T1 to the second set temperature T2, the target evaporation temperature may be determined to be decreased as the outdoor humidity increases.

In detail, when the outdoor humidity is the outdoor humidity RHA1 (the first outdoor humidity), the target evaporation temperature may be controlled to be decreased as the outdoor temperature moves from the first set temperature T1 to the second set temperature T2. When the outdoor temperature is the first set temperature T1, the air conditioner 10 may be operated according to the target evaporation temperature Tg5. In addition, when the outdoor temperature is the second set temperature T2, the air conditioner 10 may be operated according to the first reference evaporation temperature Tg1. When the outdoor temperature is between the first set temperature T1 and the second set temperature T2, the target evaporation temperature may be controlled to be linearly decreased with a first slope as the outdoor temperature increases.

The target evaporation temperature Tg5 is called "a second reference evaporation temperature". The second reference evaporation temperature may correspond to a target evaporation temperature corresponding to a preset capacity of the air conditioner 10. For example, the preset capacity of the air conditioner 10 is relatively small and may be in a range of 50% to 60% of the maximum capacity of the air conditioner 10.

When the outdoor humidity is the outdoor humidity RHA2 (the second outdoor humidity), the target evaporation temperature may be controlled to be decreased as the outdoor temperature moves from the first set temperature T1 to the second set temperature T2. In detail, when the outdoor temperature is the first set temperature T1, the air conditioner 10 may be operated according to the target evaporation temperature Tg4. In addition, when the outdoor temperature is the second set temperature T2, the air conditioner 10 may be operated according to the first reference evaporation temperature Tg1. The target evaporation temperature Tg4 may be lower than the target evaporation temperature Tg5.

When the outdoor temperature is between the first set temperature T1 and the second set temperature T2, the target evaporation temperature may be controlled to be linearly decreased with a second slope as the outdoor temperature increases. The second slope may be smaller than the first slope.

When the outdoor humidity is the outdoor humidity RHA3 (the third outdoor humidity), the target evaporation temperature may be controlled to be decreased as the outdoor temperature moves from the first set temperature T1 to the second set temperature T2. In detail, when the outdoor temperature is the first set temperature T1, the air conditioner 10 may be operated according to the target evaporation temperature Tg3. In addition, when the outdoor temperature is the second set temperature T2, the air conditioner 10 may be operated according to the first reference evaporation temperature Tg1. The target evaporation temperature Tg3 may be lower than the target evaporation temperature Tg4.

When the outdoor temperature is between the first set temperature T1 and the second set temperature T2, the target evaporation temperature may be controlled to be linearly decreased with a third slope as the outdoor temperature increases. The third slope may be smaller than the second slope.

When the outdoor humidity is the outdoor humidity RHA2 (the fourth outdoor humidity), the target evaporation temperature may be controlled to be decreased as the outdoor temperature moves from the first set temperature T1 to the second set temperature T2. In addition, when the outdoor temperature is the first set temperature T1, the air conditioner 10 may be operated according to the target evaporation temperature Tg2. In addition, when the outdoor temperature is the second set temperature T2, the air conditioner 10 may be operated according to the first reference evaporation temperature Tg1. The target evaporation temperature Tg2 may be lower than the target evaporation temperature Tg3.

When the outdoor temperature is between the first set temperature T1 and the second set temperature T2, the target evaporation temperature may be controlled to be linearly decreased with a fourth slope as the outdoor temperature increases. The fourth slope may be smaller than the third slope.

When the outdoor humidity is the outdoor humidity RHA5 (the fifth outdoor humidity), the outdoor humidity is recognized to be significantly high, and the target evaporation temperature may be controlled to remain steady at the first reference evaporation temperature Tg1, regardless of the outdoor temperature. That is, when the outdoor humidity is the outdoor humidity RHA5, and the outdoor temperature is higher than the first set temperature T1, the air conditioner 10 may be operated according to the first reference evaporation temperature Tg1. The first reference evaporation temperature Tg1 may be lower than the target evaporation temperature Tg2. Even when the outdoor humidity is higher than the outdoor humidity RHA5, the target evaporation temperature may be controlled to remain steady at the first reference evaporation temperature Tg1.

Figure 7:
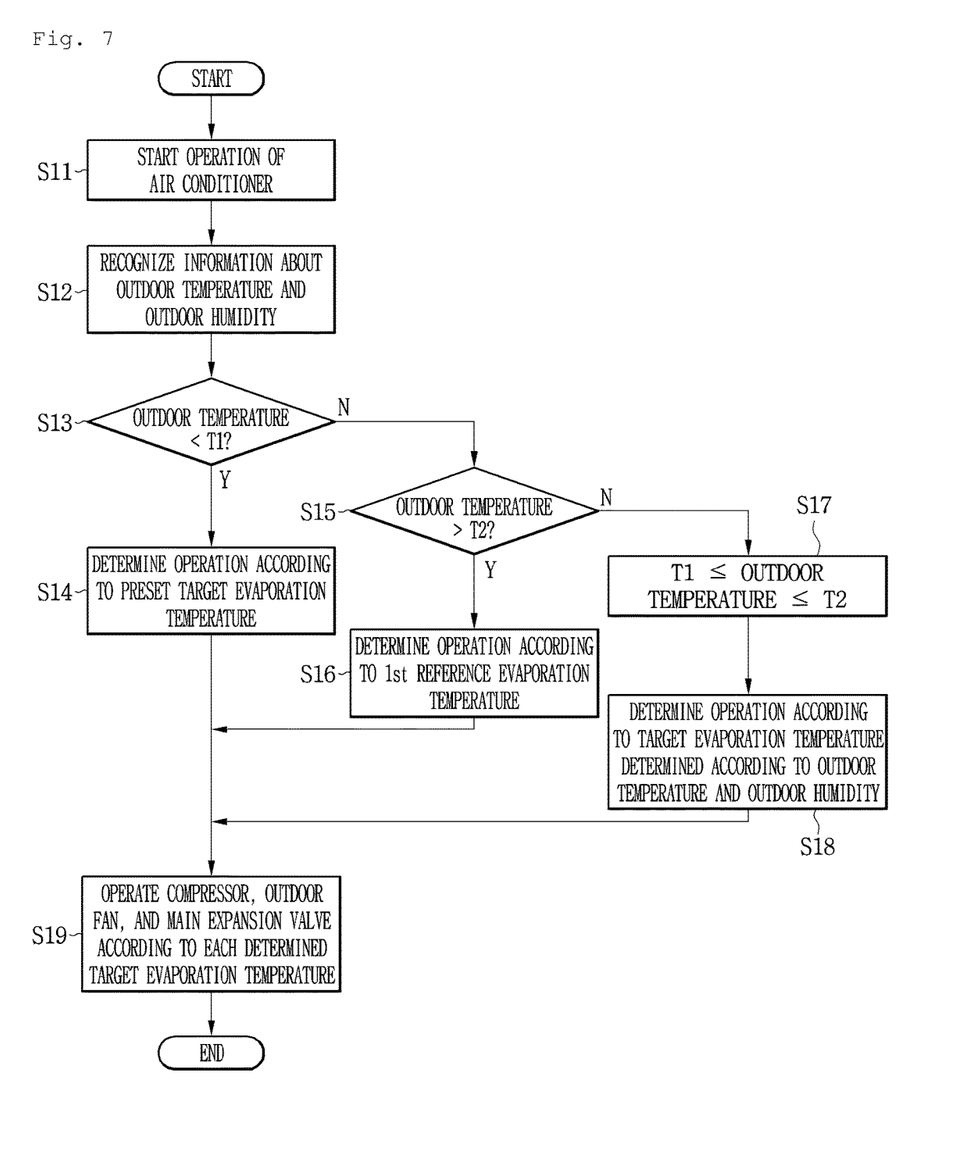
FIG. 7 is a flowchart illustrating a method of controlling the air conditioner according to the embodiment of FIG. 2.

FIG. 7 is a flowchart illustrating a method of controlling the air conditioner according to the current embodiment.

According to the current embodiment, an operation of the air conditioner 10 is started according to an input of the operation command input part 310, information about outdoor temperature and outdoor humidity is recognized through the outdoor temperature sensor 110 and the outdoor humidity sensor 120 (operations S11 and S12).

It is recognized whether the outdoor temperature is lower than the first set temperature T1. When the outdoor temperature is lower than the first set temperature T1, it is determined that the air conditioner 10 is operated according to preset target evaporation temperature. For example, the preset target evaporation temperature may be the target evaporation temperature Tg3 of FIG. 6 (operations S13 and S14).

On the contrary, when the outdoor temperature is higher than the first set temperature T1, it is recognized whether the outdoor temperature is higher than the second set temperature T2. When the outdoor temperature is higher than the second set temperature T2, it is determined that the air conditioner 10 is operated according to the first reference evaporation temperature Tg1 as target evaporation temperature (operations S15 and S16).

When the outdoor temperature is equal to or lower than the second set temperature T2, that is, when the outdoor temperature is in the range from the first set temperature T1 to the second set temperature T2, the air conditioner 10 may be operated and controlled according to mapped target evaporation temperature, based on both the information about the outdoor temperature and the information about the outdoor humidity.

In detail, it may be determined to decrease the target evaporation temperature as the outdoor temperature increases, and decrease a slope corresponding to a ratio of a decrease value of the target evaporation temperature to an increase value of the outdoor temperature as the outdoor humidity increases (operations S17 and S18).

An operation frequency of the compressor 160, the number of rotations of the outdoor fan 170, and a degree of opening of the main expansion valve 180 may be determined corresponding to the target evaporation temperatures determined in operations S14, S16, and S18, and operations of the compressor 160, the outdoor fan 170, and the main expansion valve 180 may be performed based on information obtained through the determination.

Such a control method, that is, a control method using outdoor humidity is performed to increase a capacity of an air conditioner when outer humidity is relatively high, and decrease the capacity of the air conditioner when outer humidity is relatively low, thereby improving operation efficiency of the air conditioner (S19).

Hereinafter, descriptions will be made according to other embodiments. These embodiments are partially different from the previous embodiment, in terms of configuration of an air conditioner. Thus, different parts between the previous embodiment and the current embodiments will be described principally, and a description of the same parts thereof will be omitted, and like reference numerals denote like elements throughout.

Figure 8:
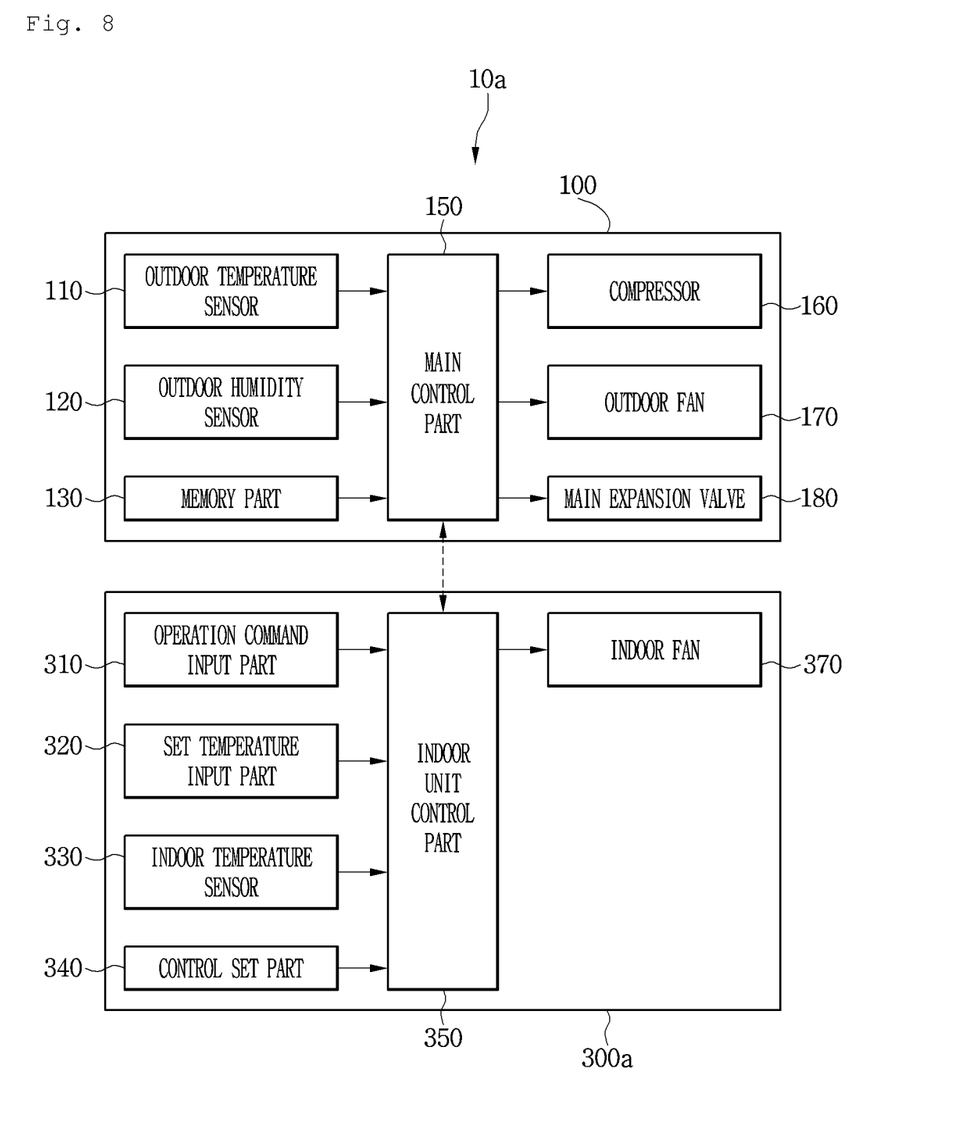
FIG. 8 is a block diagram illustrating a configuration of an air conditioner according to another embodiment.

FIG. 8 is a block diagram illustrating a configuration of an air conditioner according to one of the current embodiments.

Referring to FIG. 8, an air conditioner 10a according to the current embodiment includes an outdoor temperature sensor 110, an outdoor humidity sensor 120, a memory part 130, a main control part 150, a compressor 160, an outdoor fan 170, and a main expansion valve 180.

The air conditioner 10a includes an indoor unit 300a provided with a control set part 340. The control set part 340 is configured to turn on or off the control method using outdoor humidity as described above, in a special case where outdoor humidity and indoor humidity have no tendencies, for example, a case where an indoor space is a bathhouse or a kitchen.

When a user manipulates the control set part 340 to turn off the control method, the air conditioner 10a may be operated and controlled based on both a set temperature input through the set temperature input part 320 of the indoor unit 300a and a temperature value sensed through the indoor temperature sensor 330.

The control set part 340 may include an input part through which a predetermined humidity value may be manually input. For example, when an indoor space is a bathhouse, a user may input a value of 80% as the predetermined humidity value. The air conditioner 10a may determine target evaporation temperature according to mapping information shown in FIG. 6, based on the value of 80% and an outdoor temperature value.

The indoor unit 300a further includes the operation command input part 310 and the indoor fan 370, which are described in the previous embodiment.

The configuration according to the current embodiment provides a choice to a user in an environment where the control method using outdoor humidity is difficult to apply, so that a user-customized operation of an air conditioner can be performed.

Figure 9:
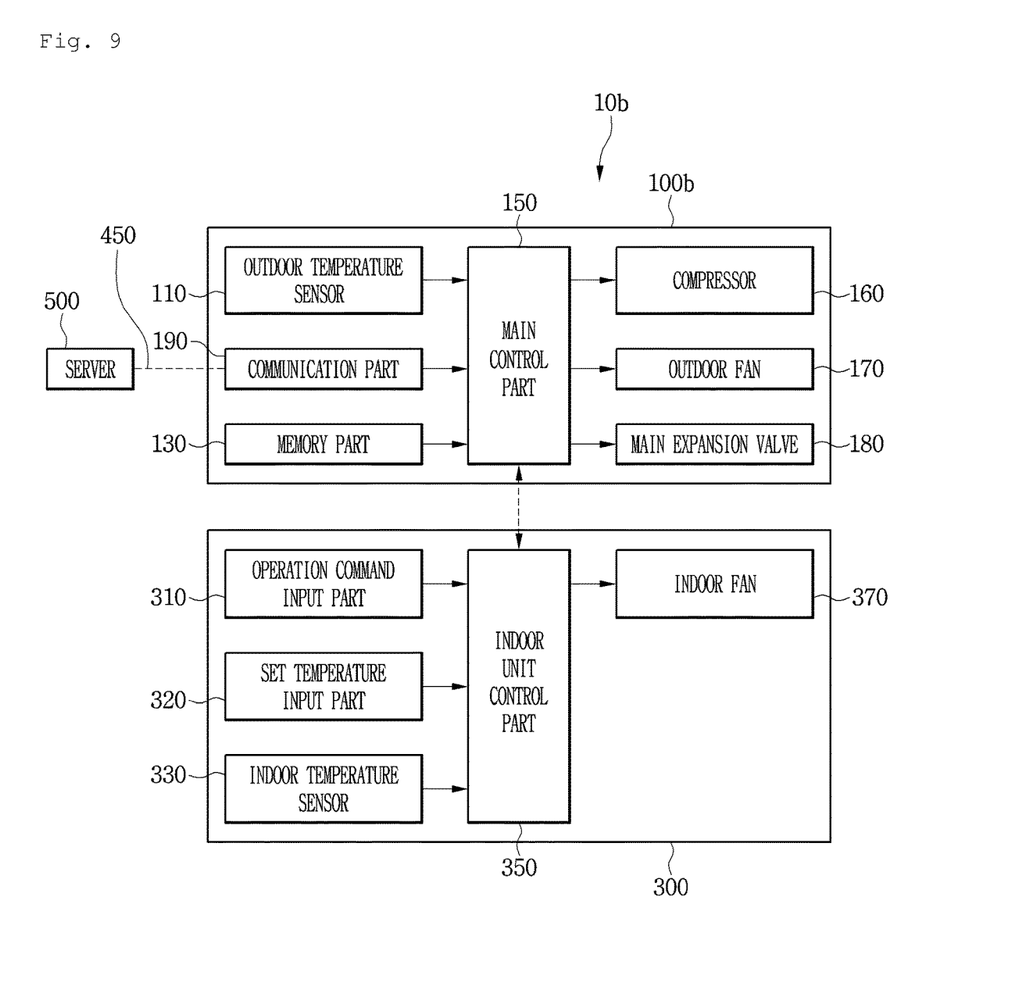
FIG. 9 is a block diagram illustrating a configuration of an air conditioner according to another embodiment.

FIG. 9 is a block diagram illustrating a configuration of an air conditioner according to the other of the current embodiments.

Referring to FIG. 9, an air conditioner 10b according to the current embodiment includes an outdoor unit 100b and an indoor unit 300. The outdoor unit 100b includes a communication part 190 that can communicate with a server 500. A communication interface 450 is defined between the server 500 and the communication part 190. For example, the communication interface 450 may include the Internet.

The server 500 has outdoor humidity information. The communication part 190 may receive the outdoor humidity information from the server 500, and the air conditioner 10b may be operated according to the control method using outdoor humidity, as described in the previous embodiment, based on the received outdoor humidity information.

A combination of the communication part 190 according to the current embodiment and the outdoor humidity sensor 120 described in the previous embodiment is called "an outdoor humidity sensing part".

Although the communication part 190 is included in the outdoor unit 100b as shown in FIG. 9, the communication part 190 may be included in the indoor unit 300.

The configuration according to the current embodiment makes it possible to obtain outdoor humidity information, without installing a humidity sensor on an outdoor unit.

An air conditioner according to an embodiment can perform high efficiency cooling control by using outdoor relative humidity. Specifically, when the outdoor relative humidity is low, evaporation temperature is increased to perform a high efficiency operation. In addition, when the outdoor relative humidity is high, the evaporation temperature is decreased to ensure a sufficient cooling capacity.

In addition, a humidity sensor may be installed on an outdoor unit to obtain relative humidity information, and thus, it is unnecessary to install a plurality of humidity sensors on a plurality of indoor units.

In addition, when the air conditioner is installed in an area where a tendency of indoor relative humidity is different from a tendency of outdoor relative humidity, a user may directly input relative humidity information to the air conditioner, and it may be selected whether to perform a control operation according to relative humidity. Thus, a user-customized control operation can be performed.

In addition, even when the humidity sensor is not installed on the outdoor unit, humidity information may be obtained from an outer server and be used to control the air conditioner, thus reducing the possibility of a trouble caused by the humidity sensor and saving costs.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner comprising:
   an outside unit provided with a compressor;
   a temperature sensor attached to the outside unit to sense outside temperature;
   a humidity recognition part attached to the outside unit to receive outside humidity information; and
   a controller to control an operation of the compressor, based on information sensed from the temperature sensor and the humidity recognition part, wherein when the outside temperature is a predetermined value, the controller determines a target evaporation temperature such that the target evaporation temperature is decreased as the outside humidity increases, and the controller operates the compressor at an operation frequency corresponding to a determined target evaporation temperature,
   wherein the controller controls the operation frequency of the compressor based on:

(a) mapped information in which the target evaporation temperature is linearly decreased as an outside temperature increases when the outside temperature is between a first set temperature (T1) and a second set temperature (T2) higher than the first set temperature (T1), (b) mapped information in which the target evaporation temperature is maintained at a predetermined target evaporation temperature according to the outside humidity, regardless of a change of the outside temperature when the outside temperature is lower than the first set temperature (T1), and (c) mapped information in which the target evaporation temperature is maintained at a first reference evaporation temperature, regardless of changes of the outside temperature and the outside humidity when the outside temperature is higher than the second set temperature (T2).

2. The air conditioner of claim 1, wherein the humidity recognition part comprises a humidity sensor.

3. The air conditioner of claim 1, further comprising a memory in which information about the target evaporation temperature is mapped according to the outside temperature and the outside humidity.

4. The air conditioner of claim 1, wherein the mapped information comprises information in which as the outside humidity increases, a slope corresponding to a ratio of a decrease value of the target evaporation temperature to an increase value of the outside temperature is decreased as the outside humidity increases.

5. The air conditioner of claim 1, wherein a predetermined target evaporation temperature mapped at a first outside humidity is higher than a predetermined target evaporation temperature mapped at a second outside humidity higher than the first outside humidity.

6. The air conditioner of claim 1, wherein when the outside humidity is equal to or greater than a predetermined humidity, the controller controls the compressor based on mapped information in which the target evaporation temperature is maintained at the first reference evaporation temperature.

7. The air conditioner of claim 1, further comprising a control set part adapted to select through an on/off operation whether to control the compressor using the outside temperature and the outside humidity, wherein the control set part is provided with an input part adapted to manually input a humidity value.

8. The air conditioner of claim 1, wherein the humidity recognition part comprises a communication part that receives the outside humidity information from a server.

9. The air conditioner according to claim 1, wherein the outside unit comprises an fan and a main expansion valve, and a rotation speed of the fan and a degree of opening of the main expansion valve are determined corresponding to the determined target evaporation temperature.

10. A method of controlling an air conditioner, comprising:

inputting an operation command for the air conditioner;

recognizing an outside temperature information and an outside humidity information; and controlling an operation of the air conditioner, based on:

(a) mapped information in which a target evaporation temperature is linearly decreased as the outside temperature increases when the outside temperature is between a first set temperature (T1) and a second set temperature (T2), (b) mapped information in which a predetermined target evaporation temperature is maintained according to the outside humidity, regardless of a change of the outside temperature when the outside temperature is lower than the first set temperature (T1), and (c) mapped information in which a predetermined target evaporation temperature is maintained regardless of changes of the outside temperature and the outside humidity when the outside temperature is higher than the second set temperature (T2).

11. An air conditioner comprising:

an outside unit provided with a compressor;

an temperature sensor attached to the outside unit to sense an outside temperature;

an humidity recognition part attached to the outside unit to receive an outside humidity information; and a controller to control an operation of the compressor, based on information sensed from the temperature sensor and the humidity recognition part, wherein when the outside temperature is in a predetermined range T1 to T2, the controller determines a target evaporation temperature based on mapped information in which the target evaporation temperature is maintained or decreased as the outside temperature increases, and the controller operates the compressor at an operation frequency corresponding to a determined target evaporation temperature, wherein the controller determines:

(a) the target evaporation temperature as a first reference evaporation temperature when the outside temperature is in the predetermined range T1 to T2 and outside humidity is equal to or greater than a preset outside humidity, (b) the target evaporation temperature based on mapped information in which the target evaporation temperature is decreased as the outside temperature increases when the outside temperature is in the predetermined range T1 to T2 and the outside humidity is lower than the preset outside humidity, (c) the target evaporation temperature as the first reference evaporation temperature when the outside temperature is higher than the predetermined range T1 to T2, and (d) that the target evaporation temperature is maintained at specific evaporation temperatures, which are mapped according to values of the outside humidity, respectively when the outside temperature is lower than the predetermined range T1 to T2.

12. The air conditioner of claim 11, wherein the mapped information in which the target evaporation temperature is decreased comprises mapped information in which the target evaporation temperature is linearly decreased.

* * * * *